Nov. 23, 1937.　　　P. MERTENS　　　2,099,748
EYEGLASS FRAME
Filed April 27, 1936　　2 Sheets-Sheet 1
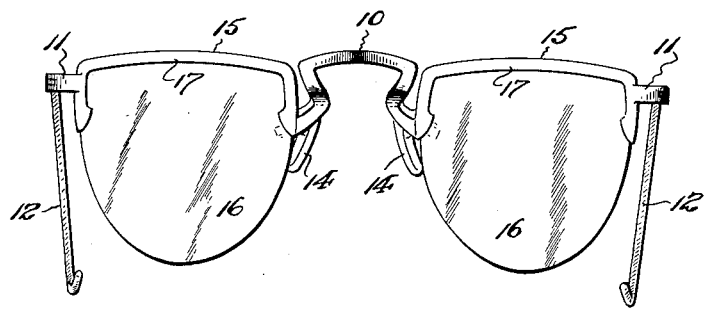
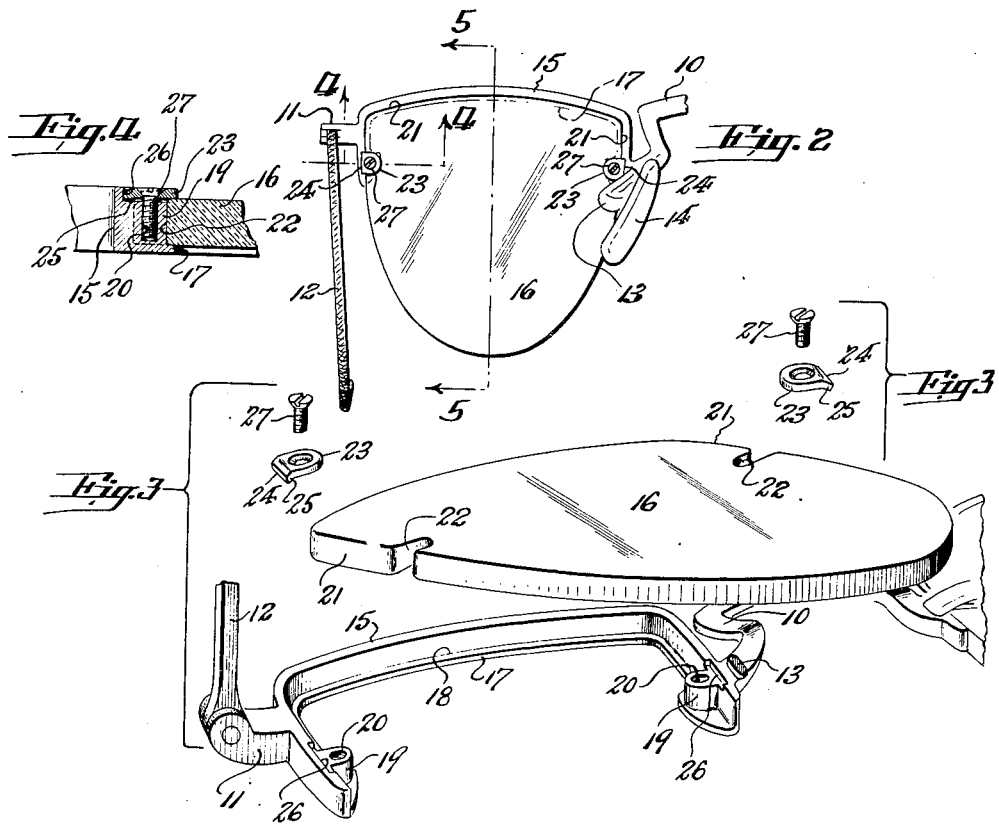
INVENTOR.
Paul Mertens,
BY George D. Richards
ATTORNEY.

Nov. 23, 1937.   P. MERTENS   2,099,748
EYEGLASS FRAME
Filed April 27, 1936   2 Sheets-Sheet 2
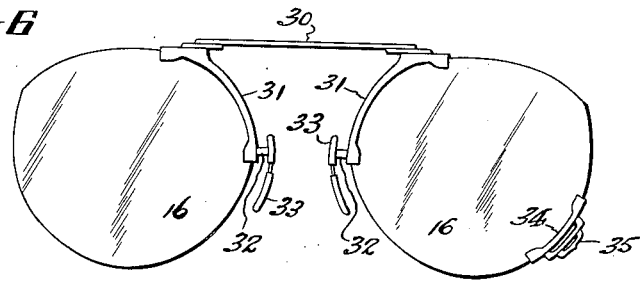
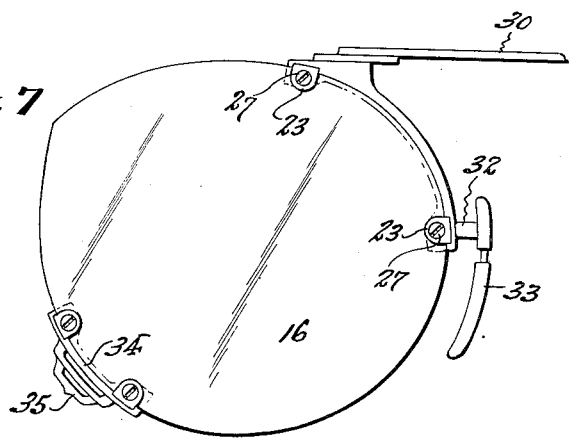
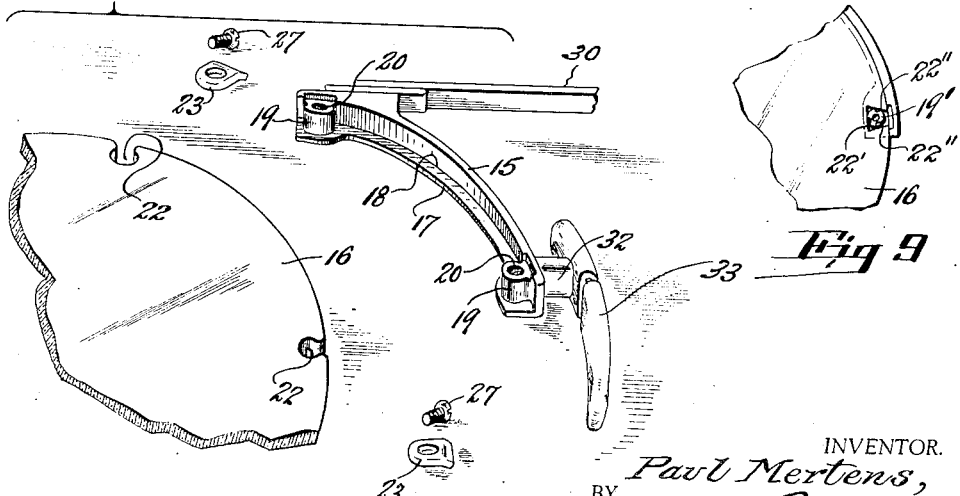
INVENTOR.
Paul Mertens,
BY George D. Richards
ATTORNEY.

Patented Nov. 23, 1937

2,099,748

UNITED STATES PATENT OFFICE 2,099,748

EYEGLASS FRAME

Paul Mertens, Newark, N. J.

Application April 27, 1936, Serial No. 76,572

3 Claims. (Cl. 88—47)

This invention relates to improvements in eyeglass frames; and the invention has reference, more particularly, to a novel eyeglass frame of the partial rim type.

This invention has for an object to provide a novel eyeglass frame comprising rim sections adapted to receive and engage only a portion of the eyeglass lenses to be supported thereby, so that much of the appearance of a rimless mounting is obtained, while nevertheless affording a lens supporting structure which is very strong and durable, and which possesses a neat and attractive appearance.

Another object of this invention is to provide rim sections of such novel form and construction as to greatly facilitate the assembling of lenses therewith, especially by retail opticians; said rim sections having novel lens coupling means cooperative with notches provided in the margins of the lenses, so that, by the mere laying of the lenses within the rim section, the operations of assembling the same are accomplished with great ease and rapidity; whereafter retention of the lenses against displacement from such assembled relations to the rim sections is attained by application of keeper washers and their fastening screws to the lens coupling means.

Other objects of this invention, not at this time more particularly enumerated, will be understood from the following detailed description of the same.

Illustrative embodiments of this invention are shown in the accompanying drawings, in which:—

Fig. 1 is a front face elevation of an eyeglass frame of the spectacle type made according to the invention; Fig. 2 is a fragmentary rear face elevation of the same, somewhat enlarged; Fig. 3 is an enlarged fragmentary perspective, showing a lens and retaining elements in disassembled relation to the frame; Fig. 4 is an enlarged detail fragmentary sectional view, taken on line 4—4 in Fig. 2; and Fig. 5 is an enlarged fragmentary sectional view, taken on line 5—5 in Fig. 2.

Fig. 6 is a front face elevation of an eyeglass frame of the Oxford type, made according to the invention; Fig. 7 is a fragmentary rear face elevation of the same, somewhat enlarged; and Fig. 8 is an enlarged fragmentary perspective, showing a lens and retaining elements in disassembled relation to the frame.

Fig. 9 is a fragmentary rear face view showing a modified arrangement of coupling boss and cooperating lens notch.

Similar characters of reference are employed in the above-described views, to indicate corresponding parts.

Referring to Figs. 1 to 5 inclusive of the drawings, a frame according to this invention and of the spectacle type is shown, the same comprising a bridge 10 from the respective ends of which extend, in opposite directions, the respective rim sections, which, in this case, are respectively provided at their outlying ends or sides, with temple end pieces or knuckle arms 11 to which the temples 12 are pivotally connected in any suitable manner. Also connected with the bridge ends, preferably adjacent to the junctions thereof with the rim sections, are rearwardly projecting arms 13 by which the nose guards or pads 14 are carried.

The rim sections may be made in variously designed shapes as to the longitudinal extension thereof from the bridge 10. Each rim section comprises a peripheral wall 15 to abut the edge of a lens 16 applied thereto, and coincident with and springing angularly from the front marginal portion of said peripheral wall 15 is a supporting wall or ledge portion 17, whereby the rim section is provided with a rearwardly open lens receiving and supporting seat 18 formed by the included angle of the inner faces of said peripheral wall 15 and said supporting wall or ledge portion 17. Within the lens receiving and supporting seats 18, at points adjacent to the extremities of the rim sections, are formed, in fixed relation to the latter, coupling bosses 19 disposed in upstanding relation to the inner faces of the supporting walls or ledge portions 17, with their outer ends projected toward the rearwardly open faces of said rim sections, and preferably terminating somewhat within the plane of the rearward free edge of said peripheral wall 15. Each rim section is preferably provided with at least two of such coupling bosses 19, although more could be provided if desired; and said coupling bosses of each rim section are suitably spaced apart in more or less opposed relation. Each coupling boss 19 is provided with an axial internally screw-threaded bore 20.

That portion, as 21, of the perimeter of lens 16 to be embraced by a rim section is, of course, ground to a shape conforming to the particular design shape of the rim section with which it is to be assembled, but the remaining portions of the lens perimeter may be given any marginal shape desired. Formed in the rim section engaging margin 21 of each lens 16, at points corresponding to and conformable with the location of the coupling bosses 19, are openings 22 through or into which the latter may extend. Preferably the coupling bosses 19 are joined to the inner face of the peripheral wall 15 of the section as shown, in which case the lens openings 22 are in the form of indented or outwardly open notches, as shown, if said coupling bosses 19 are not joined but spaced from the peripheral wall of the rim section, then the openings 22 may consist in enclosed perforations to fit such form and arrangement of coupling bosses.

Owing to the fact that the novel rim sections provide rearwardly open lens receiving and supporting seats 18, anyone, without necessity for the use of special tools, may easily and quickly apply a lens 16 in assembled relation to a rim section. To do this, it is merely necessary to oppose and register the lens marginal portion 21 to and with the outwardly open rear face of the rim section, with the openings or notches 22 aligned with the coupling bosses 19, whereupon the lens 16 is dropped down into the lens receiving and supporting seat 18 of the rim section, until the marginal portion of its front face abuts the inner face of the supporting wall of ledge portion 17, and the coupling bosses 19 engage within the lens openings or notches 22, whereupon the lens marginal portion 21 will be embraced or surrounded by the peripheral wall 15 of the rim section. When the lens 16 is thus assembled with the rim section, the means for retaining the former against outward displacement from the latter are applied. The retaining means for this purpose comprises perforate washers or clip plates 23. Preferably these washers or clip plates are provided with square inner ends 24 which are somewhat downwardly inclined, as at 25, from the plane of the bodies thereof. It is also preferable to provide in the inner face of the peripheral wall 15 of the rim section, adjacent to the outer free end of each coupling boss 19, an indented seat or notch 26 to receive and embrace said square inner ends 24 of the washers or clip plates 23, when the latter are operatively applied over the rear face of lens 16, with their perforations aligned with the internally threaded bores 20. When said washers or clip plates 23 are thus applied, fastening screws 27 are passed therethrough and screwed into the threaded bores 20 of the coupling bosses 19, thereby securing said washers or clip plates over the notched or open portions of the lens 16, and abutting the rearward face of the latter so that the same is securely and firmly held not only against displacement from the embrace of the rim section, but also against any looseness or play relative thereto.

When the lenses 16 are thus assembled and secured relative to the rim sections, the peripheral walls 15 of the latter will overlap the marginal portions of the outer faces of said lenses, and the whole assembly will not only produce a strong and efficient eyeglass frame for the support of the lenses 16, but one of very neat and attractive appearance. The rim sections also easily lend themselves to further beautifying enhancement, since the exposed exterior faces of both the peripheral and supporting walls 15 and 17 thereof may easily be provided with embellishing engraved or embossed decoration.

Referring now to Figs. 6 to 8 inclusive, the novel features of this invention have been shown therein as incorporated in an Oxford type eyeglass frame, the same comprising a spring bridge 30 to the respective ends of which are secured, by their upper ends, inwardly and downwardly extending rim sections 31. Secured to the lower ends of said rim sections 31 are the supporting arms 32 by which nose guards or pads 33 are carried in opposed relation one to the other. As in the first described construction, each rim section 31 comprises a peripheral wall 15 to abut the edge of a lens 16 applied thereto, and a supporting wall or ledge portion 17 angular thereto so as to provide the rearwardly open lens receiving and supporting seat 18. The coupling bosses 19 having the internally threaded bores 20 are fixed within the lens receiving and supporting seat 18 respectively adjacent to the upper and lower ends of each rim section. The lenses 16 are provided with the openings or notches 22 spaced to conform to and match the locations of said coupling bosses 19. When said lenses 16 are applied to the rim sections 31, in the same manner as above described the perforate washers 20 or clip plates 23 are applied and secured by the fastening screws 27, thus retaining the lenses in operative assembled relation to the rim sections.

As shown in Figs. 6 and 7 similar short rim sections 34 with corresponding lens receiving and retaining means may be utilized to carry and thus affix to one of the lenses 16, at a desired point on its periphery, an outwardly projecting finger-piece 35.

Referring to Fig. 9 I have shown the rim section as provided with a modified form of coupling boss and the lens as provided with a modified form of notch for cooperation therewith. In this modified arrangement, the coupling boss comprises a cylindrical stud 19', and the notch 25 in lens 16 in the form of an indented dovetail mortice 22' having a wide bottom and converging sides 22" extending to the lens perimeter, and there forming a mouth or gap of less width than the diameter of the coupling boss or stud 19'. This arrangement is of advantage when the bosses or studs and lens notches are more or less diametrically spaced, since the mortice or notch 22' will resist by the engagement of its sides 22" with the boss or stud 19' any tendency of the rim sections to stretch endwise, and thus pull the bosses or studs away from the notches.

Having now described certain embodiments of my invention and having set forth the novel mode of operation which is afforded thereby in assembling and retaining lenses in connection with eyeglass frames according thereto, I desire to point out that I am aware that various changes could be made in the above-described constructions, and that widely different embodiments of the invention could be made without departing from the scope thereof; consequently it is intended that all matter contained in the above description or shown in the accompanying drawings shall be interpreted as illustrative and not in a limiting sense.

I claim:—

1. In an eyeglass frame, a lens supporting rim section having a peripheral wall and a ledge portion springing from its front marginal portion in right angular relation thereto thereby to provide a rearwardly open lens receiving and supporting seat to embrace a portion of the lens perimeter and marginal portions of its front face, spaced apart coupling bosses within the angle of said seat projecting rearwardly from and being integral with said ledge portion and parallel to said peripheral wall to extend into corresponding openings provided in the lens to be engaged in said seat, thereby to retain the applied lens against outward displacement relative to said peripheral wall, said coupling bosses having axially disposed internally screw-threaded bores, perforate clip-plates for application over the rear face of the applied lens in alignment with said coupling boss bores, said clip plates having end portions bearing on the peripheral wall of the rim section and headed fastening screws, the shanks of which pass through said clip-plates and screw into said coupling boss bores, thereby to retain said lens against rearward displacement relative to said ledge portion.

2. In an eyeglass frame, in combination, a lens, a rim section to conform to a portion of the perimeter of said lens, said rim section having a rearwardly open seat of right angular cross-sectional shape formed by a peripheral wall to abut said lens perimeter and a ledge portion angular thereto to abut marginal portions of the front face of said lens, spaced apart fixed coupling bosses integral with and extending rearwardly from said ledge portion and along said peripheral wall within said angular seat, said lens having correspondingly spaced notches indenting its perimeter adapted to engage over said coupling bosses, perforate retaining elements for application to the rear face of said lens in alignment with said coupling bosses, said peripheral wall of the rim section having indentations adjacent to the free ends of said coupling bosses conformable to end portions of said retaining elements and adapted to embrace the latter to retain the same against displacement, and fastening screws the shanks of which extend through said retaining elements and into threaded connection with said coupling bosses.

3. An eyeglass frame, comprising a pair of lenses, a bridge, and temple connections, a pair of rim sections extending from opposite sides of said bridge to said temple connections and shaped to conform to the upper portions of the perimeters of said lenses, each rim section being of rearwardly open right angle shape in cross-section to provide a horizontal wall to abut perimeter portions of the associated lens and a vertical front wall to engage marginal portions of the front face of said associated lens when the latter is laid into the angular seat formed by said walls, spaced apart fixed coupling bosses within the angular seat of each rim section and integral with the latter, said lenses having correspondingly spaced openings to embrace said coupling bosses when said lenses are applied to said rim sections, said bosses having outwardly open axially disposed internally threaded bores, perforate retaining elements applicable to the rear faces of said lenses in aligned relation to said coupling boss bores, said peripheral walls of said rim sections having indentations adjacent to the free ends of said coupling bosses conformable to the end portions of said retaining elements and adapted to embrace the latter to retain the same against displacement, and fastening screws the shanks of which are engageable through said elements and threaded into said coupling boss bores.

PAUL MERTENS.